United States Patent
Grasso et al.

(10) Patent No.: US 8,984,202 B2
(45) Date of Patent: Mar. 17, 2015

(54) MULTIPLE HOST SUPPORT FOR REMOTE EXPANSION APPARATUS

(75) Inventors: Lawrence Joseph Grasso, Austin, TX (US); Barney Louis Hallman, Austin, TX (US); Bruce James Wilkie, Georgetown, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 948 days.

(21) Appl. No.: 11/762,201

(22) Filed: Jun. 13, 2007

(65) Prior Publication Data

US 2007/0283070 A1  Dec. 6, 2007

Related U.S. Application Data

(63) Continuation of application No. 11/000,318, filed on Nov. 30, 2004, now Pat. No. 8,484,398.

(51) Int. Cl.
*G06F 13/00* (2006.01)
*G06F 13/40* (2006.01)
*G06F 15/16* (2006.01)
*H04L 12/28* (2006.01)

(52) U.S. Cl.
CPC ................................. *G06F 13/4027* (2013.01)
USPC ............................. 710/301; 370/257; 709/249

(58) Field of Classification Search
USPC ............................. 710/301; 709/249; 370/257
See application file for complete search history.

(56) References Cited

U.S. PATENT DOCUMENTS

| | | | |
|---|---|---|---|
| 5,604,871 A | 2/1997 | Pecone | |
| 5,689,416 A * | 11/1997 | Shimizu et al. | 700/80 |
| 6,175,490 B1 * | 1/2001 | Papa et al. | 361/686 |
| 6,185,651 B1 * | 2/2001 | Monia et al. | 710/240 |
| 6,418,499 B1 | 7/2002 | Korowitz et al. | |
| 6,438,624 B1 | 8/2002 | Ku et al. | |
| 6,462,745 B1 * | 10/2002 | Behrbaum et al. | 345/543 |
| 6,480,724 B1 | 11/2002 | Erkkilä et al. | |
| 6,557,087 B1 * | 4/2003 | Ellison et al. | 711/154 |

(Continued)

OTHER PUBLICATIONS

Hewlett-Packard, AlphaServer GS80, GS160, and GS320 Systems Technical Summary, HP, 2002, pp. 1-21.*

(Continued)

*Primary Examiner* — Paul R Myers
*Assistant Examiner* — Christopher a Daley
(74) *Attorney, Agent, or Firm* — Edward J. Lenart; Katherine S. Brown; Kennedy Lenart Spraggins LLP

(57) ABSTRACT

A data processing assembly includes one or more hosts connected to one or more I/O Expansion Drawers. Assignment state information is stored on the Expansion Drawer to convey the assignment state of Expansion Drawer(s) resources to the hosts. The host retrieves the assignment state and, from it, determines, for each Expansion Buss cable connected to the host, the number of Expansion Cards in the Expansion Drawer to configure. A change in the number of Expansion Cards in the expansion apparatus may necessitate a change in the assignment state, which can be electronically accommodated (as opposed to a manual reconfiguration). Similarly, a failure of an Expansion Buss cable is addressed by electronically reassigning resources to another host or to the same host over a different Expansion Buss cable without the need for further manual intervention. The assembly is capable of verifying correct cable connection between a host and the Expansion Drawer.

9 Claims, 9 Drawing Sheets

(56) References Cited

U.S. PATENT DOCUMENTS

| | | |
|---|---|---|
| 6,583,989 B1 | 6/2003 | Guyer et al. |
| 6,594,150 B2 | 7/2003 | Creason et al. |
| 6,611,526 B1 | 8/2003 | Chinnaswamy et al. |
| 6,636,913 B1 * | 10/2003 | Batchelor et al. ............. 710/107 |
| 6,640,273 B1 * | 10/2003 | Spisak et al. .................. 710/104 |
| 6,725,317 B1 * | 4/2004 | Bouchier et al. .............. 710/312 |
| 6,856,518 B2 | 2/2005 | Dobbs et al. |
| 6,920,519 B1 * | 7/2005 | Beukema et al. ............. 710/306 |
| 6,928,503 B1 * | 8/2005 | Mosgrove ..................... 710/302 |
| 6,944,854 B2 | 9/2005 | Kehne et al. |
| 7,062,591 B2 * | 6/2006 | Pecone ......................... 710/308 |
| 2002/0013911 A1 | 1/2002 | Cordella et al. |
| 2002/0032867 A1 | 3/2002 | Kellum |
| 2002/0087614 A1 | 7/2002 | Kocev et al. |
| 2002/0087749 A1 * | 7/2002 | Tomioka ........................... 710/1 |
| 2002/0169912 A1 | 11/2002 | Mills et al. |
| 2003/0208599 A1 | 11/2003 | Asano et al. |
| 2004/0048503 A1 | 3/2004 | Mills et al. |
| 2005/0013123 A1 | 1/2005 | Barr et al. |
| 2005/0044284 A1 * | 2/2005 | Pescatore ........................ 710/15 |
| 2006/0004904 A1 * | 1/2006 | Sarangam et al. ............ 709/200 |

OTHER PUBLICATIONS

Hewlett-Packard, TruCluster Software Products, Compaq Computer Coropration, Version 1.6, pp. 1-1, 2-17.*

Hewlett-Packard; AlphaServer Management Station; Compaq Computer Corporation; Version 3.0 and higher; pp. 1-19.*

Hewlett_Packard; AlphaServer GS80, GS160, and GS320 Systems Technical Summary; HP; 2002; pp. 1-21.

Hewlett-Packard; TruCluster Software Products; Compaq Computer Corporation; Version 1.6; pp. 1-1, 2-17.

Hewlett Packard; AlphaServer GS80, GS160, and GS320 Systems Technical Summary; HP; 2002; pp. 1-21.

Hewlett Packard; TruCluster Software Products; Compaq Computer Corporation; Version 1.6; pp. 1-1, 2-17.

Hewlett Packard; AlphaServer Management Station; Compaq Computer Corporation; Version 3.0 and higher; pp. 1-19.

* cited by examiner

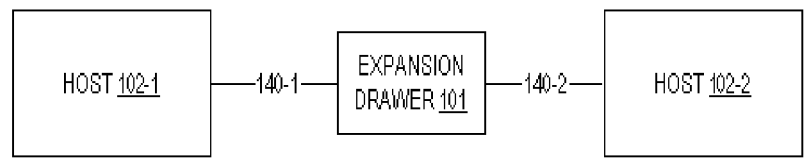
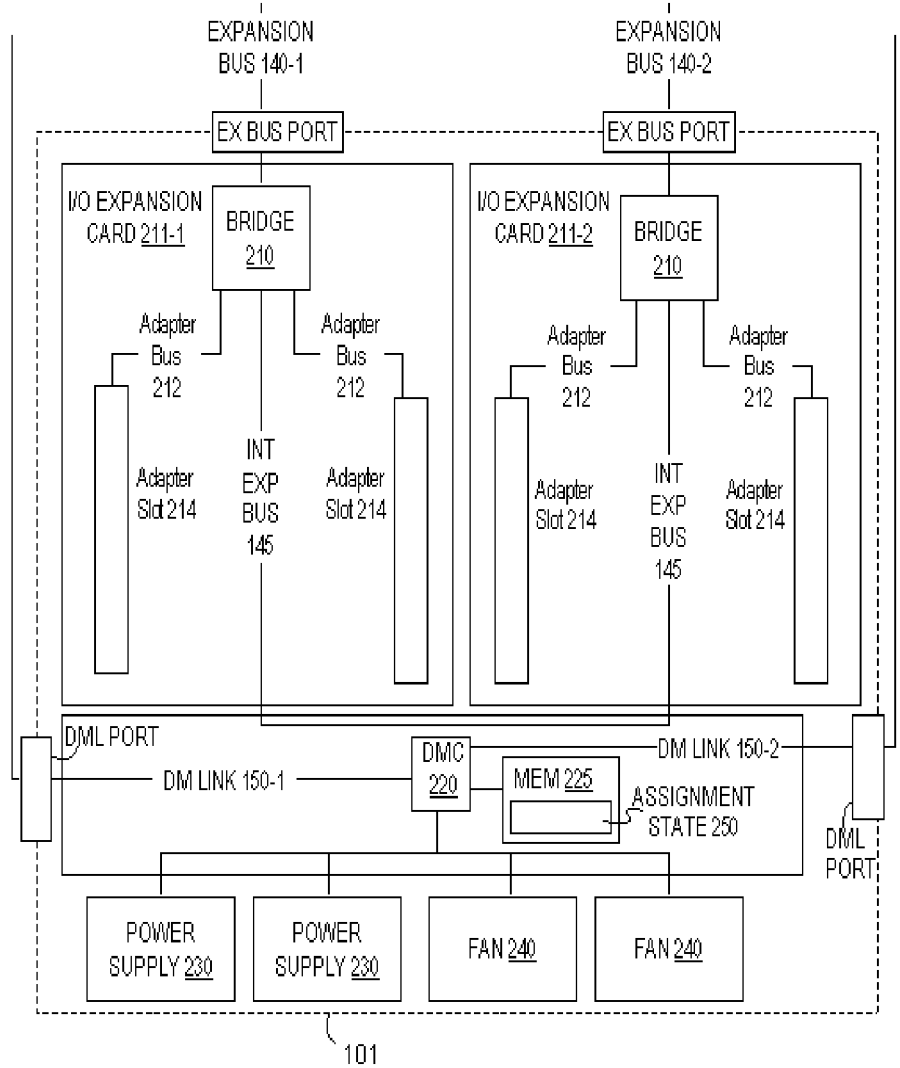

MULTIPLE HOST SUPPORT FOR REMOTE EXPANSION APPARATUS

CROSS-REFERENCE TO RELATED APPLICATION

This application is a continuation application of and claims priority from U.S. patent application Ser. No. 11/000,318, filed on Nov. 30, 2004, now U.S. Pat. No. 8,484,398.

BACKGROUND

1. Field of the Present Invention

The present invention is in the field of data processing systems and, more particularly, data processing systems employing external or remote I/O resources.

2. History of Related Art

Data processing systems require resources to perform input/output (I/O) operations. Such I/O resources include, as examples, adapter cards for persistent storage devices and network communications. The adapter cards preferably comply with an industry standard buss interface, such as PCI or PCI-X. The system processing unit utilizes these I/O resources via a bridge device, which accesses the I/O interface buss. Generally, all of the I/O structure is inside the system chassis. Customers generally require a processing system, herein called the host, which will enable them to expand their I/O capacity as their business demand evolves. Simultaneously, customers want maximum flexibility including, as examples, the ability to share I/O resources across multiple hosts, and to alter the assignment of resources between these hosts. Manufacturers have responded to these requirements by offering products referred to herein as expansion apparatus or expansion drawers. An I/O Expansion Drawer is a box or chassis that connects to a host via an expansion buss. An I/O Expansion Drawer generally includes one or more expansion cards, each with multiple adapter card "slots" that may be populated with the desired adapter cards.

With the present expansion drawer implementations, it is generally difficult and time consuming to reassign the I/O resources in the I/O Expansion Drawer to another host. For example, when a host fails, the I/O resources within the I/O Expansion Drawer are no longer available. These I/O resources can be made available again by reassigning them to another host, but it is undesirable to require system administrators to physically move the I/O Expansion Drawer, or move the adapter cards from the I/O Expansion Drawer to another host. It is desirable to implement an electronic means that changes the assignment of I/O resource between multiple hosts for the user.

SUMMARY OF THE INVENTION

The objective identified above is addressed by an electronic means and service for assigning one or more I/O Expansion Drawers, or a portion of an I/O Expansion Drawer, among one or more hosts. Many configurations of host(s) and I/O Expansion Drawer(s) are possible. For example, some hosts have one or two I/O Expansion Busses; larger hosts may have even more I/O Expansion Busses. The number of I/O Expansion Drawers in any given configuration is variable, as is the number of I/O Expansion Cards within the I/O Expansion Drawer. The number of I/O expansion buses within the I/O Expansion Drawer is also variable. The I/O Expansion Drawers may be directly attached to the host via the host's I/O Expansion Busses, or they may be daisy chained together, via the I/O Expansion Drawers' own I/O Expansion Busses, then attached to one or more hosts.

In addition, the present invention provides a means to secure I/O Expansion Cards so that other hosts are prevented from accessing its resources. A means of power management is provided that prevents one host from powering off an I/O Expansion Drawer without concurrence from another attached host, as well as an override means that allows one host to power off, or power on, the I/O Expansion Drawer when concurrence is impossible because the other attached host is unresponsive. Further, the electronic assignment service provides a means to support configurations of either homogeneous or heterogeneous hosts, or configurations in which the individual host operating systems may be different. The electronic assignment service can be utilized by a network management agent to manage complex configuration of hosts and I/O Expansion Drawers.

OVERVIEW OF OPERATIONS

This preferred embodiment enables assignment service requests to be successfully processed across multiple subsystems such as, but not limited to, the host's BIOS, the I/O Expansion Drawer's controller, and remote management agents. For example, during boot the host's BIOS can determine how many I/O Expansion Cards have been assigned to it for configuration, and thereby avoid configuring an I/O Expansion Card assigned to another host. The host's BIOS can also confirm that its I/O Expansion Buss cable and its management link cable to the I/O Expansion Drawer are correctly connected to the same side of the I/O Expansion Drawer.

I. Definitions of Terms

I/O Expansion Drawer (Drawer)—This is any chassis, external to the host, which provides additional I/O Expansion Card slots. There are two buss connections between the I/O Expansion Drawer and the host: the I/O Expansion Buss and the Drawer Management Link. Note that an I/O Expansion Drawer may be derived from a second data processing assembly, whether or not the assembly can be configured to operate as an I/O resource without its onboard data processors and memory, but can be interconnected to other data processing assemblies.

I/O Expansion Buss—The buss and its associated cables and connectors that provide the high speed data interface between the host and the I/O Expansion Drawer and/or between I/O Expansion Cards within a drawer.

Drawer Management Link (DML)—The buss and its associated cables and connectors that provide the interface between the host's Service Processor and the Drawer Management Controller located in the I/O Expansion Drawer. This need not be a separate physical cable; for example, it could be integrated into the same cable as the I/O Expansion Buss.

Drawer Management Controller (DMC)—The logic, preferably implemented in a microprocessor that monitors and controls the environmental conditions within the I/O Expansion Drawer, including the installed I/O Expansion Cards and other chassis electronic subassemblies. Some of the DMC duties are the monitoring or control of fans, temperature, voltage, and setup and run-time parameters I/O Expansion Card—A planar (printed circuit board) located in the I/O Expansion Drawer. The planar has an I/O Expansion Buss, an I/O expansion bridge device, an adapter buss, and multiple onboard adapter slots. A card most likely has just one bridge device, but designs with a plurality of bridge devices can be used per I/O Expansion Card. Each bridge device connects an I/O Expansion Buss to an adapter buss. The I/O Expansion Card slots preferably support PCI or PCI-X buss architecture, but can include support for any other adapter buss architecture.

I/O Expansion Bridge Device—The bridge device converts the I/O Expansion Buss into the adapter buss on the I/O Expansion Card. For example, there is bridge device which converts the IBM RIOG expansion buss into a PCI-X adapter buss.

Service Processor (SP)—Preferably implemented as a small logic card that resides within the host chassis and provides a number of services including, but not limited to, configuration checking, fault detection, error reporting and logging, firmware update support for the host (and itself), a variety of alert forwarding methods, Setup and Configuration utilities for the user, a number of remote connection methods, remote login, remote host reset and remote power control, remote video, remote diagnostics, and remote reporting of host environmental conditions.

II. I/O Expansion Drawer Model

In one embodiment, the I/O Expansion Drawer may include elements and design features found in an RXE-100 Expansion Drawer from IBM Corporation.

In such an embodiment, each Drawer can have up to two I/O Expansion Cards. One "side" of the I/O Expansion Drawer is termed Side A and the other is Side B. Each side can contain one I/O Expansion Card.

In the Drawer, there is an I/O Expansion Buss connection from Side A to Side B built into the Drawer. Some I/O Expansion Drawers may have a physical external cable to provide this connection.

In the preferred implementation, Side A is populated in every I/O Expansion Drawer such that drawers with one I/O Expansion Card will have a Side A.

In an embodiment that emphasizes cost reduction, a single physical DMC in the model Drawer monitors and controls all of the I/O Expansion Cards in the Drawer. Other implementations may have a DMC for each I/O Expansion Card (i.e., IBM pSeries design). In one implementation of the single physical DMC model, the DMC is preferably configurable into one of two modes of operation, namely, a "Split Mode" and a "Unified Mode." The Split Mode of operation refers to a mode in which the DMC is logically partitioned to support host commands directed only to the Side A or only to the Side B. A Unified Mode of operation refers to a mode in which the DMC will accept commands from a single host for both the Side A and if present, the Side B also.

Both sides of the Drawer preferably have a Drawer Management Link (DML). The DML from the host can be dedicated to either the Side A or the Side B (Split Mode) or the DML can control both sides (Unified Mode).

The I/O Expansion Drawer further contains power supplies, cooling fans, diagnostic indicators, and mechanical packaging. The Drawer complies with standards regarding audio noise levels, electromagnetic emissions, fragility, etc.

Though other I/O Expansion Drawers can have different details, the electronic assignment service described herein may easily be made to support them as well.

III. Electronic Assignment Commands

The assignment state information for each I/O Expansion Card is stored in the I/O Expansion Drawer. Using a small set of commands, a host retrieves the assignment state from each Drawer that is attached to its DML. From the retrieved assignment state information, the host determines, for each I/O Expansion Buss cable (connected between the host and the Drawer), the number of I/O Expansion Cards in each I/O Expansion Drawer to be configured. Similarly, the host can request additional I/O Expansion Cards or release I/O Expansion Cards via the same small set of commands. In one implementation, the command set includes three types: Report Assignment, Change Assignment, and End Assignment. The manner in which each subsystem within the host and Drawer respond to each command type is described below for a preferred embodiment.

A. Host BIOS Functions and Commands:

1. User Initializes Host:

The user resets (or powers-on) a host with its I/O Expansion Drawer(s) attached.

2. Report Assignment Commands:

For each I/O Expansion Drawer attached, during boot time (topology configuration), the host BIOS issues an initial command to obtain the DMC ID, the I/O Expansion Drawer side (A or B), and the Drawer Management address to which the DML is attached. The host BIOS issues a second type of command to obtain the number of I/O Expansion Cards (in each Drawer) assigned to it.

For each of its I/O Expansion Busses, BIOS checks if the first I/O bridge device is already configured (by another host). Snooping is done with I/O Expansion Buss speed set to the default speed. If the bridge device is not configured, then BIOS configures it and obtains the DMC ID and I/O Expansion Drawer side (A or B). With the information from the initial command and the information obtained via the first configured bridge device, BIOS can determine if the DML and the I/O Expansion Buss cables are connected correctly. If the bridge device is already configured BIOS must retry before it concludes it should not configure this particular I/O expansion bridge device (as it may already be configured by another host).

The BIOS configures the appropriate I/O expansion bridge devices on each of its I/O Expansion Busses. In so doing, BIOS takes into consideration the number of I/O Expansion Busses to decide how best to distribute I/O resources and optimize I/O performance. The BIOS resets any bridge devices that it had temporarily configured which were not assigned to it. BIOS will post an error message to the host's Event Log if it detected incorrectly connected cables.

3. User Examines Reported Assignments:

The user enters a BIOS Setup menu which displays information for each attached I/O Expansion Drawer. In general, the information presented to the user contains the DMC ID and the I/O Expansion Drawer side (A or B) to which the host's DML is attached, the DMC ID and the I/O Expansion Drawer side to which the host's I/O expansion cables are attached, and any cabling mismatches between the DMC cable and the I/O Expansion Buss cable. In addition, "none" is presented when BIOS has not configured any bridge devices on an I/O Expansion Buss. Otherwise, the display also includes the number of I/O Expansion Cards currently assigned to the host, and which of these cards are marked with a reserved designator, the number of currently unassigned I/O Expansion Cards, and whether any of the unassigned cards are also reserved or have a nonfunctional host. The BIOS periodically refreshes this menu while it is displayed (via a heartbeat from the host to the DMC), to signal that session remains active.

4. Change Assignment Commands:

From the BIOS Setup menu, the user may release or request additional I/O Expansion Cards. When the user requests an unassigned I/O Expansion Card, BIOS issues one of three forms of a Change Assignment command, which includes whether the I/O Expansion Card is to be reserved for this host only. If the I/O Expansion Card is reserved, then only this host will be able to access the I/O Expansion Card (i.e., enhanced security). BIOS will not issue any assignment commands if there are no unassigned I/O Expansion Cards available. BIOS will not allow an I/O Expansion Card with a reserved designator to be assigned to a new host, even if the I/O Expansion Card's current host is nonfunctional.

When the user releases an assigned I/O Expansion Card from the host, BIOS will issue a Change Assignment command which changes the status of the I/O Expansion Card to unassigned and clears the reserved designator for the card if it was previously enabled.

The BIOS updates the Setup menu display of assigned/unassigned I/O Expansion Cards after each user change, via the Report Assignment command. The BIOS does not retain any displayed data across boot cycles as there is no need to do so. This enables a host to be replaced, and for the new host to electronically obtain the I/O Expansion Card assignment states without user intervention.

5. End Assignment:

When the user exits from the Setup menu, BIOS issues an End Assignment command to end the reconfiguration session. The BIOS resets the host if the configuration change was successfully acknowledged by the DMC.

B. DMC Functions and Commands:

After AC power is first applied to the I/O Expansion Drawer, and standby power is established in the Drawer for the first time, the Drawer Management Controller reports its ID and its I/O Expansion Drawer Side (A or B) to the host. The assignment state data for each I/O Expansion Card is stored in the I/O Expansion Drawer itself and accessed by the DMC. If one or none of the I/O Expansion Cards have been assigned to a host, then the DMC will put the I/O Expansion Drawer in Split Mode configuration. If both of the I/O Expansion Cards have been assigned to the same host then the Drawer is placed in Unified Mode.

1. Response to Report Assignment Command:

When a host issues a Report Assignment command, the Drawer Management Controller in the addressed I/O Expansion Drawer will not honor any other subsequent assignment commands from a second host until the first host issues an End Assignment command. The DMC will reply to the second host with "busy" in the interim.

In response to the Report Assignment command, the DMC in the I/O Expansion Drawer returns to the host BIOS its DMC ID, the I/O Expansion Card Side (A or B) to which its Drawer Management Link cable is attached, and the number of I/O Expansion Cards assigned to the requesting host. If an I/O Expansion Card had previously been designated as reserved then the DMC will report it as such. The DMC also returns the number of unassigned I/O Expansion Cards available to the requesting host.

If the DMC determines that a nonfunctional host controls an I/O Expansion Card, (i.e., the host is AC powered-off or failed), then the I/O Expansion Card will be included in the number of unassigned I/O Expansion Cards. The I/O Expansion Card will be reported with a nonfunctional host designator. If the I/O Expansion Card had previously been "reserved" then the I/O Expansion Card will be reported with a reserved designator.

2. Response to Change Assignment Commands:

When a host issues a Change Assignment command, the Drawer Management Controller in the addressed I/O Expansion Drawer will respond to the command if the DMC has already accepted and responded to a Report Assignment command from the host, and not yet responded to an End Assignment command from the same host. Otherwise, the DMC will reply to the host with "busy". The host BIOS will not issue Change Assignment commands if there are no I/O Expansion Cards available, nor will it issue a Change Assignment command for an I/O Expansion Card if it is reserved by another host. The DMC may guard against these two possibilities, but is not required to do so. There are three variations of the Change Assignment command:

a. Claim NO expansion cards for the requesting host:

The DMC will leave the current I/O Expansion Drawer mode (i.e., split or unified) unchanged, un-assign all previously claimed I/O Expansion Cards for the host, and reset the reserved designator and the nonfunctional host designator for each I/O Expansion Card, update the total number of assigned and unassigned I/O Expansion Cards, and return a pass/fail completion code to the host.

b. Claim FIRST-available expansion card for the requesting host:

The DMC will place the I/O Expansion Drawer in split mode, assign the first-available I/O Expansion Card to the requesting host, update the reserve designator as needed, and reset the nonfunctional host designator for the card. The DMC will then release any other I/O Expansion Card in the Drawer previously claimed by the host, and reset the reserve and nonfunctional host designators for the card. Finally, the DMC will update the total number of assigned and unassigned I/O Expansion Cards, and return a pass/fail completion code to the host.

c. Claim ALL-available expansion cards for the requesting host:

The DMC will place the I/O Expansion Drawer in unified mode, assign all available I/O Expansion Cards to the requesting host, update the reserve designator as required, reset the nonfunctional host designator for each card, update the count of assigned and unassigned I/O Expansion Cards, and return a pass/fail completion code to the host.

3. Response to End Assignment Command:

When a host issues a Report Assignment command, the Drawer Management Controller in the addressed I/O Expansion Drawer will not honor any other subsequent assignment commands from a second host until the first host issues an End Assignment command. The DMC will reply to the second host with "busy" in the interim.

The End Assignment command completes the changing of I/O Expansion Card assignments for the host and concludes a host's monopoly on the I/O Expansion Drawer's DMC, which then allows the DMC to accept assignment commands from another host. The End Assignment command does not affect the I/O Expansion Drawer mode, nor does it affect the I/O Expansion Cards' assignments and designators.

The Drawer Management Controller can check for the possibility that a host has become non-functional during the change assignment process; i.e., initiate a dead man timer after the previous assignment command has been completed, or reset a dead man timer with the heartbeat from the BIOS Setup menu. If a non-functional host is detected then the DMC will initiate the End Assignment on its own, and attempt to post an error message in the host's Event Log.

C. Remote Management Agent Functions and Commands:

A management agent provides a centralized facility for invoking the I/O Expansion Card assignment commands described above for the BIOS Setup menu. The management agent, such as the IBM Director product from the IBM Corporation, usually resides on a remote server. Managing the deployment of remote I/O resources requires the interaction of the host's Service Processor, the I/O Expansion Drawer's DMC, and the remote management agent. The Service Processor is the entity that passes the host BIOS commands to the DMC, and return the DMC responses back to the host BIOS.

The management agent is connected to the Service Processor via a network connection, such as an Ethernet link. The management agent can change an I/O Expansion Card's assignment by sending the Report, Change, and End Assignment commands to the host's Service Processor (just as the local host BIOS does). The Service Processor forwards the agent's command to the DMC and returns the DMC response to the agent. In this manner, the assignment of multiple I/O Expansion Cards for multiple hosts can be accomplished from a remote location. The type of hosts under management need not be homogeneous so long as the on-board Service Processor can forward the agent's command to the DMC in the I/O Expansion Drawer.

The management agent is capable of accomplishing all of the same assignment functions that can be accomplished via the BIOS Setup menu, except that the agent cannot determine by itself if the DML and I/O Expansion Buss cables are connected correctly. In this case, the management agent must request the host BIOS to verify that the cables are connected correctly. Following successful configuration of the I/O resources, the management agent can restart each of the hosts.

IV. Summary of Host/Drawer Configurations

The data processing assembly may include a first host of a first platform type to connect to at least one I/O Expansion Drawer, connected to the first host by a first I/O Expansion Buss cable. The I/O Expansion Drawer includes a first expansion card assigned to and configured by the first host. A storage device in the Drawer contains the assignment state indicating the assignment of the I/O Expansion Card to the first host.

A second host of a second platform type may be connected to a second I/O Expansion Card of the I/O Expansion Drawer by a second I/O Expansion Buss cable. The assignment state in this case is indicative of the assignment state of the second I/O Expansion Card, as well as the first I/O Expansion Card. The assembly includes facilities or code to prevent the first and second hosts from contending over (i.e., trying to configure) a common resource.

The first host may include a second I/O Expansion Buss connected to a second I/O Expansion Card, where the first host configures the first and second I/O Expansion Cards (for enhanced data throughput performance). The assembly may employ an automated failover method permitting a host to access or configure an I/O resource with its second I/O Expansion Buss cable when the first I/O Expansion Buss cable fails.

The data processing assembly may include a second I/O Expansion Drawer daisy chained to the first Drawer, where the first host is enabled to configure expansion cards in each of the I/O Expansion Drawers.

The I/O Expansion Drawer may include a single Drawer Management Controller configured to maintain the assignment state for multiple I/O Expansion Cards in the Drawer.

The DMC may assume a first configuration state in which the first and second I/O Expansion Cards are configured by a first host (Unified Mode), and a second configuration state in which the first and second I/O Expansion Cards are configured by different hosts (Split Mode).

V. Summary of Electronic Assignment Capabilities

The preferred embodiment includes electronic assignment capabilities that enable a replacement host to retrieve the assignment information from the I/O Expansion Drawer thereby enabling the replacement host to configure the proper I/O Expansion Cards.

The electronic assignment capabilities incorporate a security feature which prevents a second host from reassigning an I/O Expansion Card from a first host.

The electronic assignment capabilities prevent a first host from powering off the I/O Expansion Drawer without concurrence from a second host that is attached to the same Drawer. This power off prevention may be overridden to allow the first host to power off the I/O Expansion Drawer if the second host is a failed host. For example, a DMC may determine that the Drawer is in Split Mode (Side A and Side B separately controlled). The DMC may also determine that the second host connected to it is a failed host (e.g., via the absence of a host heartbeat, the lack of connectivity with the host's Service Processor, etc.). Under such circumstances, the DMC may treat the power off request from one host, in the absence of a functional second host, as tantamount to a request from both hosts, and power off the I/O Expansion Drawer.

The electronic assignment capabilities provide a preferred means to assign resources from a failed I/O Expansion Buss cable to another host or to the same host over a different I/O Expansion Buss cable.

A change in the number of I/O Expansion Cards in the expansion apparatus may necessitate a change in the assignment state, which can be electronically accommodated, as opposed to further manual reconfiguration.

The electronic assignment capability preferably supports management of the I/O Expansion Drawer and the I/O Expansion Card configurations, including dynamic alteration of I/O Expansion Drawer and I/O Expansion Card assignment changes.

The electronic assignment capability is capable of verifying correct cable connection between the host and the I/O Expansion Drawer. The electronic assignment capability provides support for remote configuration management of networked homogeneous or heterogeneous data processing assemblies.

BRIEF DESCRIPTION OF THE DRAWINGS

Other objects and advantages of the invention will become apparent upon reading the following detailed description and upon reference to the accompanying drawings in which:

FIG. 1 is a block diagram of a host/expansion drawer assembly according to an embodiment of the present invention;

FIG. 2 is a block diagram of selected details of the expansion drawer of FIG. 1;

Figure 3:
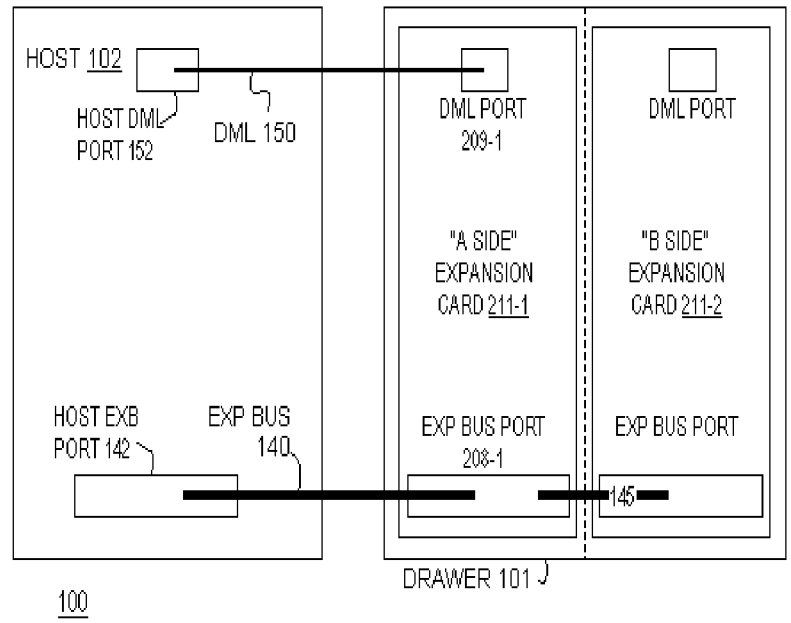
FIG. 3 illustrates a first configuration of a host/expansion assembly according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention is directed at techniques for connecting and using data processing systems or hosts and I/O Expansion Drawers. An expansion drawer maintains information about the assignment of its I/O resources and can communicate this information to hosts. When a host is booted, it acquires information regarding the assignment of expansion drawer I/O resources from the expansion drawer itself. This technique facilitates the replacement of one host for another, because the replacement host is able to acquire the assignment information from the expansion drawer. In addition, by locating control of I/O assignment in the expansion drawer, the invention also assists in preventing contention among the various hosts that may be competing for I/O resources. The expansion drawer may, for example, restrict communication to one system at a time thereby preventing conflicts. Other features and benefits will become apparent in the following description.

Referring now to the drawings, FIG. 1 is a simplified block diagram of a data processing assembly 100 including one or more hosts 102-1 and 102-1 (generically or collectively referred to herein as host(s) 102) connected to one or more an I/O expansion apparatus or expansion drawers 101 (only one of which is shown) according to one embodiment of the present invention. In the depicted configuration, hosts 102-1 and 102-2 are connected to drawer 101 by corresponding expansion busses 140-1 and 140-2. Assembly 100 may also be referred to herein as host/expansion assembly 100. Each host 102 may be implemented as a single or multiprocessor system. Although the depicted host/expansion assembly 100 includes a single expansion drawer and two hosts, other configurations may include more hosts and more expansion drawers. Before discussing different configurations of host/expansion assembly 100, a description of a host 102 is provided.

Figure 10:
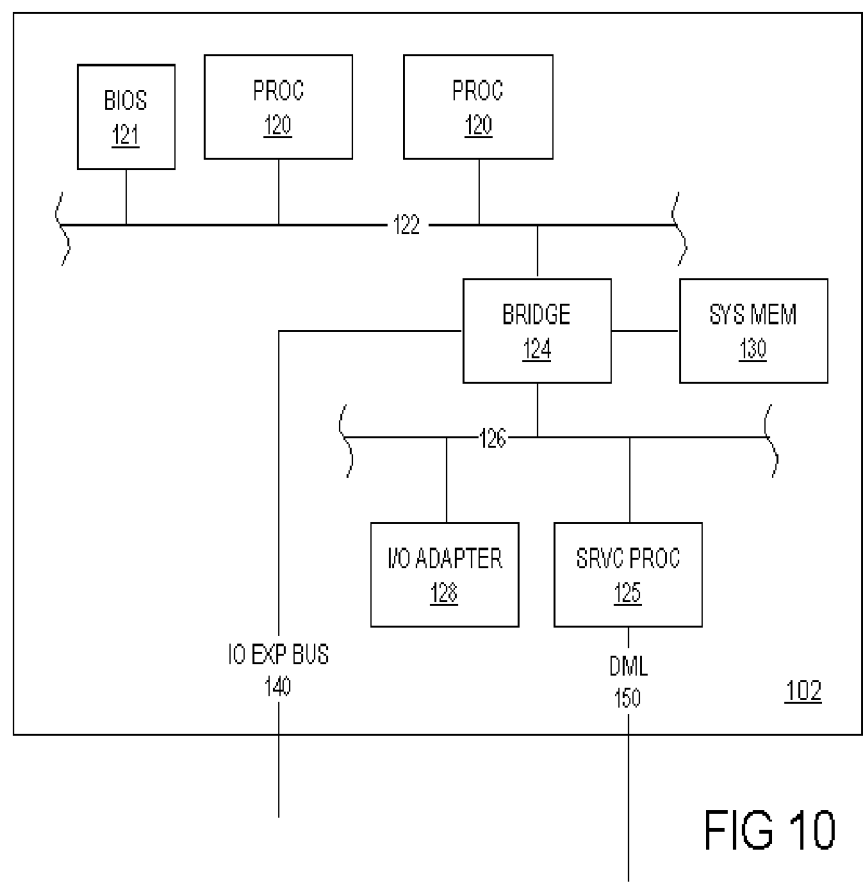
FIG. 10 is a block diagram of selected elements of a host according to an embodiment of the present invention.

Referring to FIG. 10, selected elements of an exemplary embodiment of host 102 are illustrated. In the depicted embodiment, host 102 includes one or more general purpose processors 120 connected to a common host buss 122. In an embodiment desirable for its value to customers, processors 120 are from Intel Corporation. In other embodiments, host 102 may be based on the PowerPC® family of microprocessors from IBM Corporation.

A bridge 124, which may be implemented as a chip set distinct from processors 120, integrated within processor(s) 120, or a combination of both, connects host buss 122 and processors 120 to various system resources. In the depicted embodiment, bridge 124 connects system memory 130 to host buss. System memory 130 is preferably implemented with one or more DRAM chips or modules. Bridge 124 as shown also provides an interface between host buss 122 and a peripheral buss represented by reference numeral 126. Peripheral buss 126 may be an industry standard I/O buss such as PCI or PCI-X. One or more I/O adapters 128 (only one of which is shown) are connected to peripheral buss 126. I/O adapters 128 may include one or more network communication devices, hard disk adapters, and the like.

Bridge 124 as depicted in FIG. 10 also provides an interface between host buss 122 and an I/O Expansion Buss 140. I/O Expansion Buss 140 represents the cables and connectors to provide a high-speed data interface between the host and an I/O Expansion Drawer. I/O Expansion Buss 140 may be implemented with an application specific or proprietary protocol.

Host 102 as depicted in FIG. 10 further includes a service processor 125 coupled to the I/O buss 126. Service processor 125 is a microcomputer, including random access memory and program storage (not shown), within host 102. Service processor 125, and BIOS 121, are responsible for initializing and testing the logic interconnects that constitute assembly 100 and configuring them for normal operation. Service processor 125 also supervises the functional health of the host and the expansion drawer while the system is in operation to detect any failing components as they occur. Service processor 125 also provides an interface between a management and/or deployment utility and the host.

Of particular interest to the present invention, service processor 125 provides an interface between expansion drawer 101 and host 102 of FIG. 1. More specifically, service processor 125 provides a communication conduit between BIOS 121 and a controller of the expansion drawer 101. A physical link between service processor 125 and expansion drawer 101 is shown in FIG. 10 and referred to herein as drawer management link (DML) 150. DML 150 provides the link over which commands and responses are routed between hosts 102-1 or 102-2 and expansion drawer 101.

Figure 6:
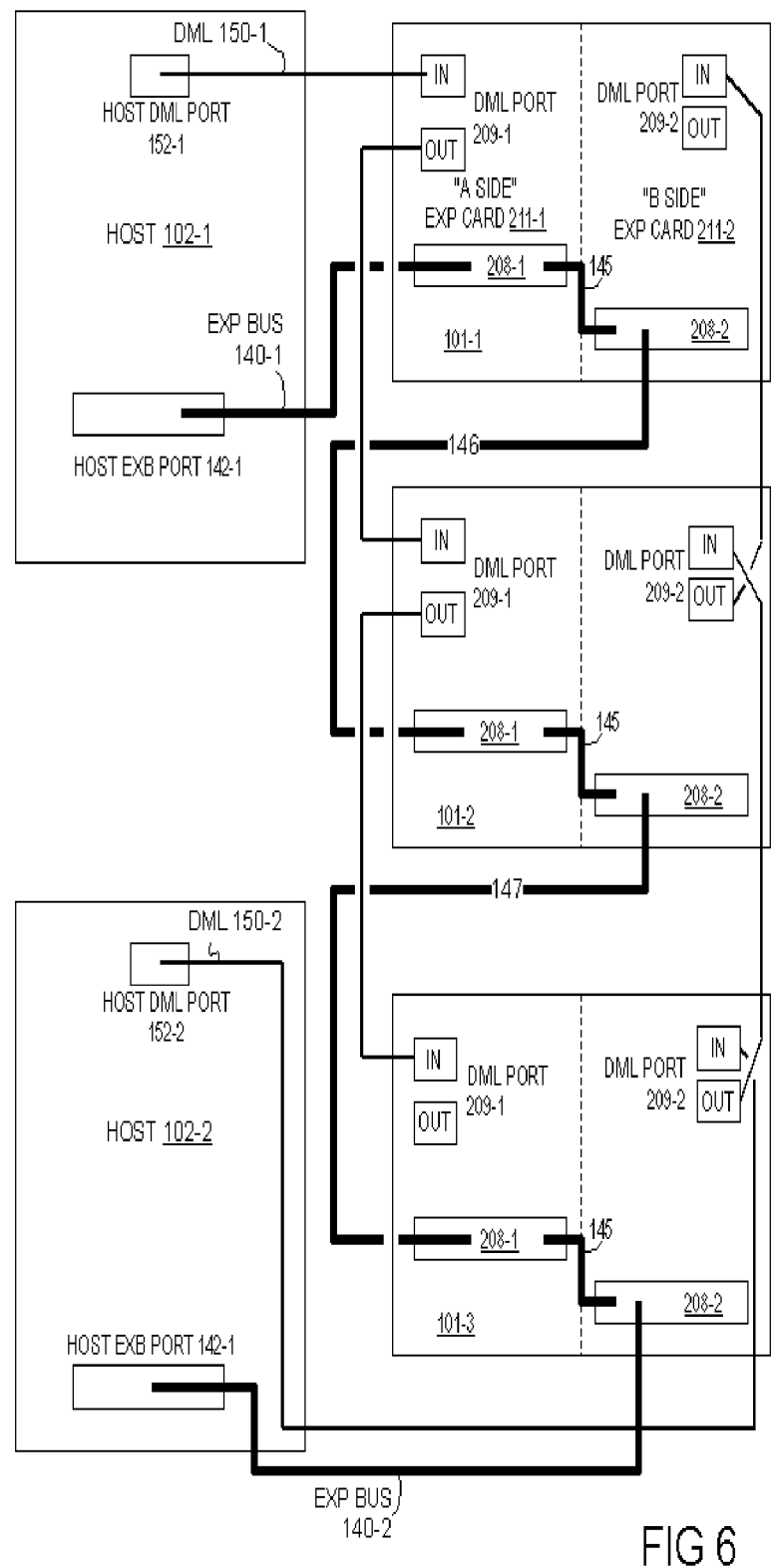
FIG. 6 illustrates a fourth configuration of a host/expansion assembly according to the present invention.

Referring now to FIG. 2, selected elements of an embodiment of expansion drawer 101 are shown. Expansion drawer 101 provides I/O resources for hosts 102, to which expansion drawer 101 is connected. The I/O resources provided by expansion drawer 101 are referred to as external or remote I/O (RIO) resources. The I/O resources provided by an expansion drawer 101 include storage resources such as hard disk adapters and/or network resources such as multiple network adapters. The depicted embodiment of expansion drawer 101 includes components found in the RXE-100 expansion drawer from IBM Corporation. In this embodiment, expansion drawer 101 is a remote I/O drawer that attaches to the host 102. Expansion drawer 101 has two expansion cards 211 and each expansion card 211 provides six additional I/O adapter card slots 214. In the embodiment depicted in FIG. 2, expansion drawer 101 includes first and second I/O Expansion Cards 211-1 and 211-2 (generically or collectively referred to herein as I/O Expansion Card(s) 211). I/O Expansion Card 211-1 represents the A-side of expansion drawer 101 while I/O Expansion Card 211-2 represents the B-side of expansion drawer 101. Each expansion card 211 is connectable to a corresponding I/O Expansion Buss 140-1 or 140-2 that provides the data interconnect between a host 102 and expansion drawer 101. Each expansion card 211 includes a bridge 210 that provides an interface between the corresponding I/O Expansion Buss 140 and the individual adapter busses 212 and their corresponding adapter slots 214. In the depicted embodiment, bridge 210 also provides an internal I/O Expansion Buss 145 that is routed internally between the A-side 211-1 and the B-side 211-2 expansion cards. Internal expansion buss 145 enables a single host to access both of the expansion cards all of the I/O adapter slots 214 via a single external I/O Expansion Buss 140 when both expansion cards 211 are present in the expansion drawer 101 (as shown in FIG. 3). In addition, internal expansion buss 145 facilitates the daisy chaining of two or more expansion drawers 101, as shown in FIG. 6.

The depicted embodiment of expansion drawer 101 includes logic, firmware, software or a combination thereof that is referred to herein as drawer management controller (DMC) 220. DMC 220 has access to local memory 225. Local memory 225 may include both nonvolatile storage (flash memory cards, EEPROMs, and the like) and volatile memory devices (DRAMs, SRAMs, etc.). DMC 220 is shown as being connectable to first and second DML cables 150-1 and 150-2 where the first DML cable 150-1 is connectable to a service processor of a first host 102-1 and the second DML cable is connectable to a second host 102-2.

DMC 220 according to the present invention communicates with hosts 101 and maintains information concerning the assignment and availability of I/O resources including expansion cards 211 within expansion drawer 101. This information, which is generally referred to herein as the assignment state information, is preferably stored locally (within the expansion drawer 101) in a nonvolatile portion of local memory 225. The assignment state of expansion drawer 101 is indicated in FIG. 2 by reference numeral 250. DMC 220, as its name suggests, provides management of the drawer itself. In this function, DMC 220 may be responsible, for example, for monitoring operating conditions of power supplies 230, environmental fans 240, and the expansion cards 211. Although the described embodiment integrates the resource assignment functionality and the drawer management functionality into a single identified element, it will be appreciated that these functions may be implemented in distinct chips or chipsets. In an application where cost is a predominant consideration, however, it is preferable to integrate these functions into a single controller or microprocessor chip.

Expansion drawer 101 includes multiple or redundant power supplies 230 and fans 240. In the preferred embodiment, power supplies 230 and 240, as well as the adapter cards that are inserted in adapter slots 214 are hot swappable. Hot swappable capability enables the customer to replace components without powering down the entire drawer.

The depicted embodiment of expansion drawer 101 includes a single DMC 220, but may include two expansion cards 211. It is desirable if the expansion cards 211 are separately configurable and controllable so that, for example, a first host is responsible for configuring the first expansion card while a second host is responsible for configuring the second expansion card. In addition, however, maximum flexibility is achieved if it is also possible to authorize a single host to configure both sides of expansion drawer 101.

Accommodating these different configuration arrangements is achieved in one embodiment of the invention by configuring DMC 220 with at least two operating modes. In a "split" mode, DMC 220 is logically partitioned to support host commands directed only to the A-side or the B-side of the expansion drawer. In split mode, DMC 220 will only receive commands for the A-side expansion card 211 from the A-side DML 150-1. Similarly, DMC 220 will only receive commands for the Side B expansion card 211 from the B-side DML 150-2 when in split mode. In addition, there may a subset of unified commands that causes DMC 220 to act for both sides of expansion drawer 101 even when the drawer is in split mode. For example, in a fault condition where one DML is inoperative, the DMC 220 can receive a forced power-off command from another DML which will result in both sides of the expansion drawer being power-off in split mode.

In a "unified" mode, DMC 220 accepts commands from a single host for both the A-side and the B-side (if present) I/O Expansion Cards and the controlling side for a non-failover case is determined by which DML port is attached. For example, when in unified mode if the DML is attached to the Side B of the I/O Expansion Drawer, then the I/O Expansion Card assignment will be to the Side B I/O Expansion Buss. In this way the DMC 220 stores a relative relationship between the I/O Expansion Cards and the I/O Expansion Busses.

As indicated above, the present invention contemplates various arrangements of host/expansion assembly 100. Assembly 100, for example, may include a variable number of hosts 102, a variable number of expansion busses 140 per host, a variable number of expansion drawers 101, a variable number of expansion cards 211 per expansion drawer, and a variable number of adapter busses 212 per expansion card. The hosts 102 may be homogenous (of the same platform type) or heterogeneous (of different platform types). The platform type, as used in this disclosure, refers to the processor and operating system combination of a host 102. Moreover, in the described embodiment, all of the possible permutations of host/expansion assembly 100 are managed at the drawer level by a single DMC 220.

Various possible configurations of host/expansion assembly 100 are described in the following paragraphs. In all of these configurations, assembly 100 includes functionality to achieve a variety of remote I/O resource and management tasks. This functionality may be implemented in various elements of host/expansion assembly 100. In the preferred implementation, however, the primary elements responsible for providing this functionality include the DMC 220, the host BIOS 121 (and service processor 125), and a remote management agent 104 (shown in FIG. 11).

The remote I/O resource assignment and management functionality preferably provides at least some of the following features. DMC 220, in conjunction with BIOS 121, is configured to enable a host 102 to retrieve I/O resource assignment state information from expansion drawer 101. The assignment state assists host 102 in determining the number of expansion cards 211 to configure for each expansion buss 140. If, for any of a variety of reasons, the number of expansion cards assigned to a host (or to a particular expansion buss of a host) changes, DMC 220 and BIOS 121 make the necessary adjustments such that, during a subsequent boot, BIOS 121 configures all of those and only those expansion cards assigned to the corresponding host 102. The re-assignment of I/O resources would preferably occur without requiring the user or administrator to alter the cabling topology.

DMC 220 and BIOS 121 are preferably configured to detect the failure of a host connection (i.e., an expansion buss 140) during operation and, in response, to assign the I/O resources previously associated with the failed expansion buss to a new expansion buss of the existing host. Depending upon the operating system's use of an advanced programmable interrupt controller (APIC), the assignment of resources from a failed expansion buss to a functional buss may be accomplished dynamically (i.e., without rebooting the host) although there may be operating system environments that require a reboot.

Along these same lines, the I/O resource assignment facilities of host/expansion assembly 100 are preferably able to detect incorrect cabling problems, such as when a DML 150 from a first host is connected to a B-side DML port and the first host's I/O Expansion Buss 140 is connected to an A-side expansion buss port.

The I/O resource assignment features of host/expansion assembly 100 preferably further include a means to secure an expansion card, which has been assigned to a first host, from being re-assigned to a second host. This feature is particularly relevant in the context of secure or confidential data. The use of a reserved indicating described below facilitates this feature.

In addition, host/expansion assembly 100 should preferably provide power management facilities that prevent one host from powering off the expansion drawer without consent from the host of the other side of the expansion drawer (when applicable). This consent feature may be overridden when the other side host has failed.

Referring now to FIG. 3 through FIG. 6, various configurations of host/expansion assembly 100 are presented to illustrate the flexibility of the expansion drawer 101. When the host 102 is booted, it obtains configuration information from the DMC, over DML cable 150. This information includes the DMC ID for each DMC found on the DML, whether each I/O expansion box is operating in unified or split mode, the number of I/O Expansion Cards to claim within the I/O Expansion Drawer. The DMC also reports to host 102 which DML port (A-side or B-side) is being used to access the I/O Expansion Drawer. The host BIOS determines the number of active I/O Expansion Busses. With this information the host BIOS then determines which I/O Expansion Buss to use and the number of I/O Expansion Cards to configure.

FIG. 3 depicts a single host, single expansion drawer implementation of host/expansion assembly 100 in which the host 102 is connected to the A-side expansion card 211-1 of expansion drawer 101. Specifically, the DML cable 150 is connected between a DML port 152 of host 102 and a DML port 209-1 of A-side expansion card 211-1 of expansion drawer 101. An expansion buss cable 140 is connected between an expansion buss port 142 of host 102 and an expansion buss port 208-1 of the A-side of expansion card 211-1. The internal expansion buss 145 connects the A-side expansion buss to the B-side of drawer 101.

In this relatively simple configuration, drawer 101 is operated in the unified mode in which commands sent over DML cable 150 are executed on both sides of the expansion drawer 101 (assuming that there is an expansion card 211-2 present on the B-side). The A-side expansion card, according to one embodiment provides a set of six adapter slots (not shown in FIG. 3). In addition, if B-side expansion card 211-2 is present, host 102 can acquire the B-side I/O resources thereby effectively acquiring an additional six adapter slots for a total of 12 additional slots. Because the host 102 likely has six or fewer expansion slots, the described embodiment of expansion drawer 101, when operated in the configuration depicted in FIG. 3, enables an assembly 100 having three times the I/O resources of host 102.

Figure 4:
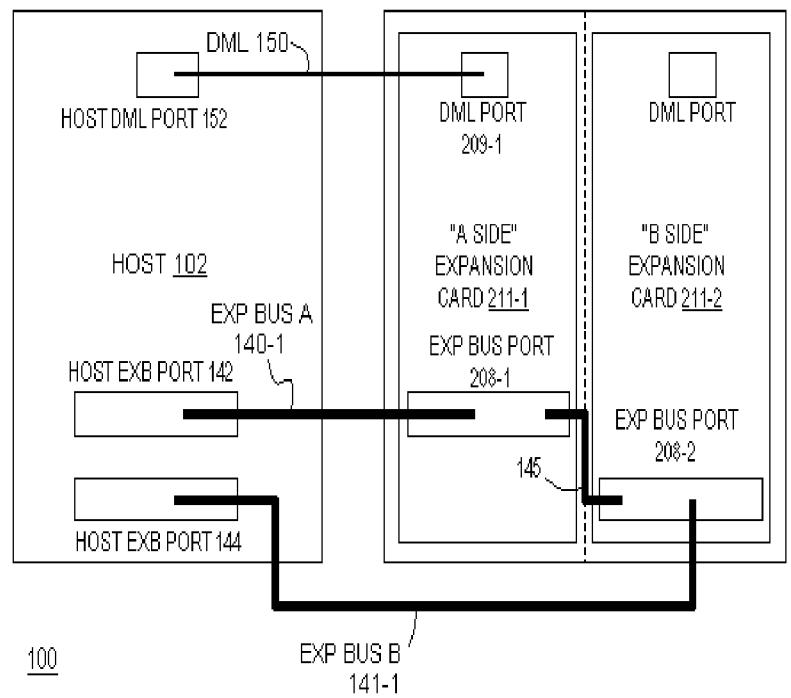
FIG. 4 illustrates a second configuration of a host/expansion assembly according to the present invention.

Referring now to FIG. 4, a variation of the single host, single expansion drawer embodiment depicted in FIG. 3 is presented. In the configuration of FIG. 4, a single host 102 includes a pair of expansion buss ports 142 and 144. A first expansion buss 140-1 connects host expansion buss port 142 to the expansion buss port 208-1 on the A-side expansion card 211-1 while a second expansion buss 140-2 of host 102 is connected between a second expansion buss port 142 of host 102 and the expansion buss port 208-2 on the B-side expansion card 211-2. A single DML link 150 is connected between the host DML port 152 and the DML port 209-1 on the A-side expansion card 211-1.

In this configuration, expansion drawer 101 and its DMC (not shown in FIG. 4) are again operated in a unified mode in which commands from host 102 are applied to both the A and B-side expansion cards 211-1 and 211-2. This configuration of host/expansion assembly 100 provides performance and redundancy advantages over the configuration depicted in FIG. 3. I/O performance is potentially increased by the availability of two I/O Expansion Busses 140-1 and 140-2. In addition, reliability is improved because, in the event that the first expansion buss 140-1 fails, the second expansion buss 140-2 remains. I/O resources to be accessed by the first expansion buss then may be accessed by the second buss.

Figure 5:
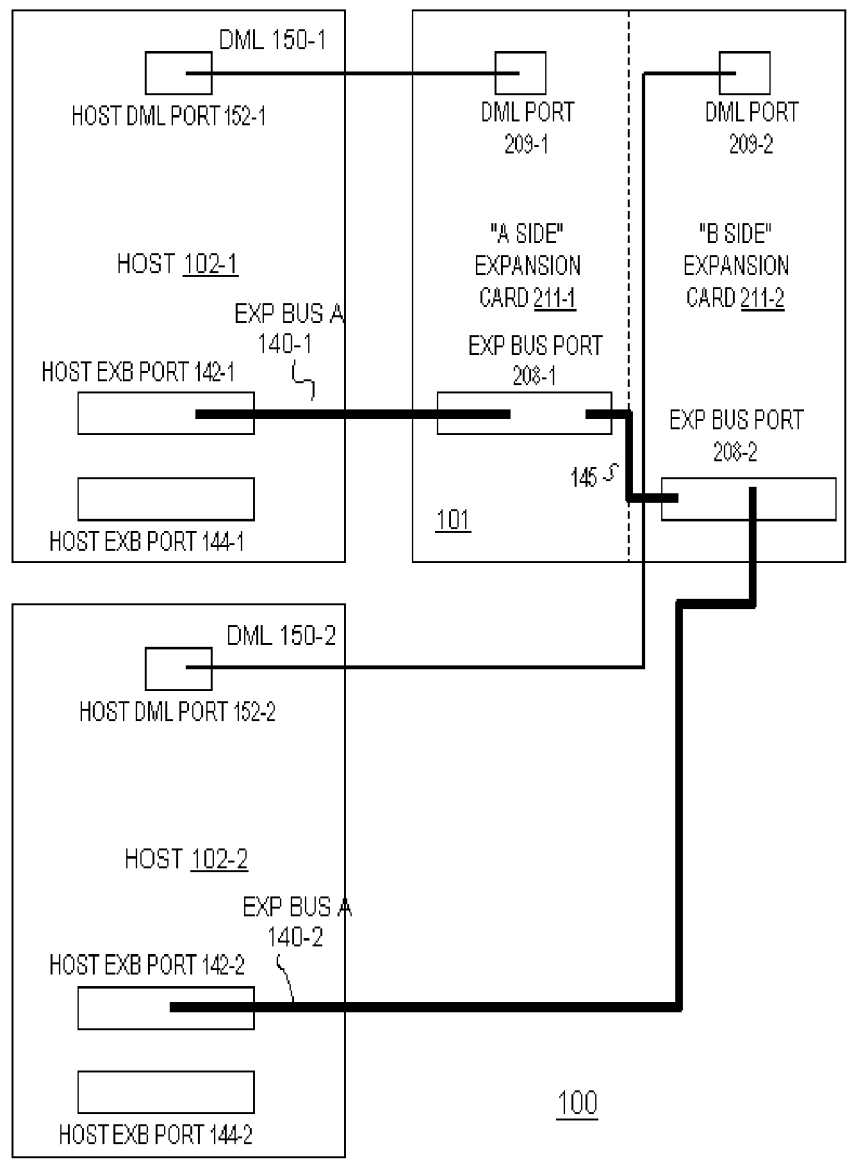
FIG. 5 illustrates a third configuration of a host/expansion assembly according to the present invention.

Referring now to FIG. 5, the depicted embodiment of assembly 100 includes a first host 102-1 and a second host 102-2 sharing a single expansion drawer 101. In this configuration, a DML link 150-1 from first host 102-1 is connected to a DML port 209-1 on the A-side expansion card 211-1 of expansion drawer 101. A DML link 150-2 from second host 102-2 is connected to a DML port 209-2 on the B-side expansion card 211-1. An expansion buss 140-1 connects the expansion port 142-1 of first host 102-1 to the A-side expansion port 208-1 of expansion drawer 101 while a second expansion buss 140-2 connects the expansion port 142-2 of second host 102-2 to a B-side expansion port 208-2 of expansion drawer 101.

In this configuration, the DMC of expansion drawer 101 (not shown in FIG. 5) places expansion drawer 101 in split mode. Configuration of the B-side expansion card 211-2 is done via commands sent over the B-side expansion buss 140-2, from host 102-2. Configuration of the A-side expansion cards 211-1 is done via commands sent over the A-side expansion buss 140-1, from host 102-1. Assuming that each host 102 requests an expansion card, expansion drawer 101 will record information showing the B-side expansion card 211-2 as being assigned to host 102-2 and the A-side expansion card 211-1 as being assigned to the first host 102-1. The host will only configure the expansion card that has been assigned to it. This generally prevents one host from taking control of another host's expansion card. In the event that a host becomes non-functional, the management agent 104 may direct that the expansion card from the non-functional host be assigned to the surviving host, if not precluded by security.

Referring now to FIG. 6, a multi-host, multi-drawer embodiment of assembly 100 is depicted. In this configuration, a set of three expansion drawers 101-1, 101-2, and 101-3, are connected together to provide a daisy-chained expansion buss connecting to as many as six expansion cards 211 (two cards in each drawer). The expansion buss in this case includes the expansion buss 140-1 connected to host 102-1, the internal expansion busses 145, the inter-drawer expansion busses 146 and 147, and the expansion buss 140-2 connected to host 102-2. The six available expansion cards 211 may be assigned to the two hosts in any combination: 6-0, 5-1, 4-2, 3-3, and so forth.

The DML 150-1 from first host 102-1 is connected through a series connection to the DML ports 209-1 of drawers 101-1, 101-2, and 101-3. Similarly, the DML 150-2 from second host 102-2 is connected through a series connection to the DML ports 209-2 of drawers 101-1, 101-2, and 101-3. In this manner, each host 102 can issue commands to (i.e., configure) any or all of the drawers 103.

An assignment of the resources between the two hosts 102-1 and 102-2 may be manifested by controlling the split mode and unified mode of each drawer 101. If, for example, three of the six expansion cards 211 are assigned to first host 102-1 and the other three cards are assigned to second host 102-2, this assignment might be enforced by placing first drawer 101-1 in unified mode under control of first host 102-1, third drawer 101-3 in unified mode under control of second host 102-2, and second drawer 101-2 in split mode, with first host 102-1 controlling its A-side expansion card (not shown) and second host 102-2 controlling its B-side expansion card. With this assignment in place, the BIOS of first host 102-1 would configure two expansion cards in the first expansion drawer and the A-side expansion card in the second expansion drawer 211 on its I/O Expansion Buss 140-1 during boot. Similarly, the BIOS of second host 102-3 would configure three expansion cards on its I/O Expansion Buss 140-2.

The split mode of second drawer 101-2 would mark an expansion buss boundary for each of the hosts. If four expansion cards are assigned to first host 102-1 and two expansion cards are assigned to second host 102-2, this assignment could be enforced by placing drawers 101-1 and 101-2 in unified mode under the control of host 102-1 and placing drawer 101-3 in unified mode under the control of host 102-2.

FIG. 3 through FIG. 6 depict various physical configurations of host/expansion assembly 100. Host/expansion assembly 100 includes software and/or firmware in addition to the physical hardware architecture. As such, portions of the present invention may be implemented as a set or sequence of computer executable instructions that are stored on a computer readable medium. The medium could be a magnetic disk, an optical disk, a flash memory device, or some other suitable form of persistent memory. During times when the instructions are being executed, at least some of the instructions may reside in a volatile medium such as a DRAM or SRAM based memory device. In the context of the present invention, the computer executable instructions, when executed, enable host/expansion assembly 100 to manage the assignment of remote I/O resources according to the present invention.

Managing the assignment of remote I/O resources according to the present invention requires interaction of different elements of assembly 100. The primary elements that participate in the remote I/O resource assignment and management process include the BIOS 121 of host(s) 102, the service processor 125 of host(s) 102, and the DMC 220 of expansion drawer(s) 101. In addition, a remote deployment/management agent may also be used to effect the I/O resource assignment and management described herein.

Figure 7:
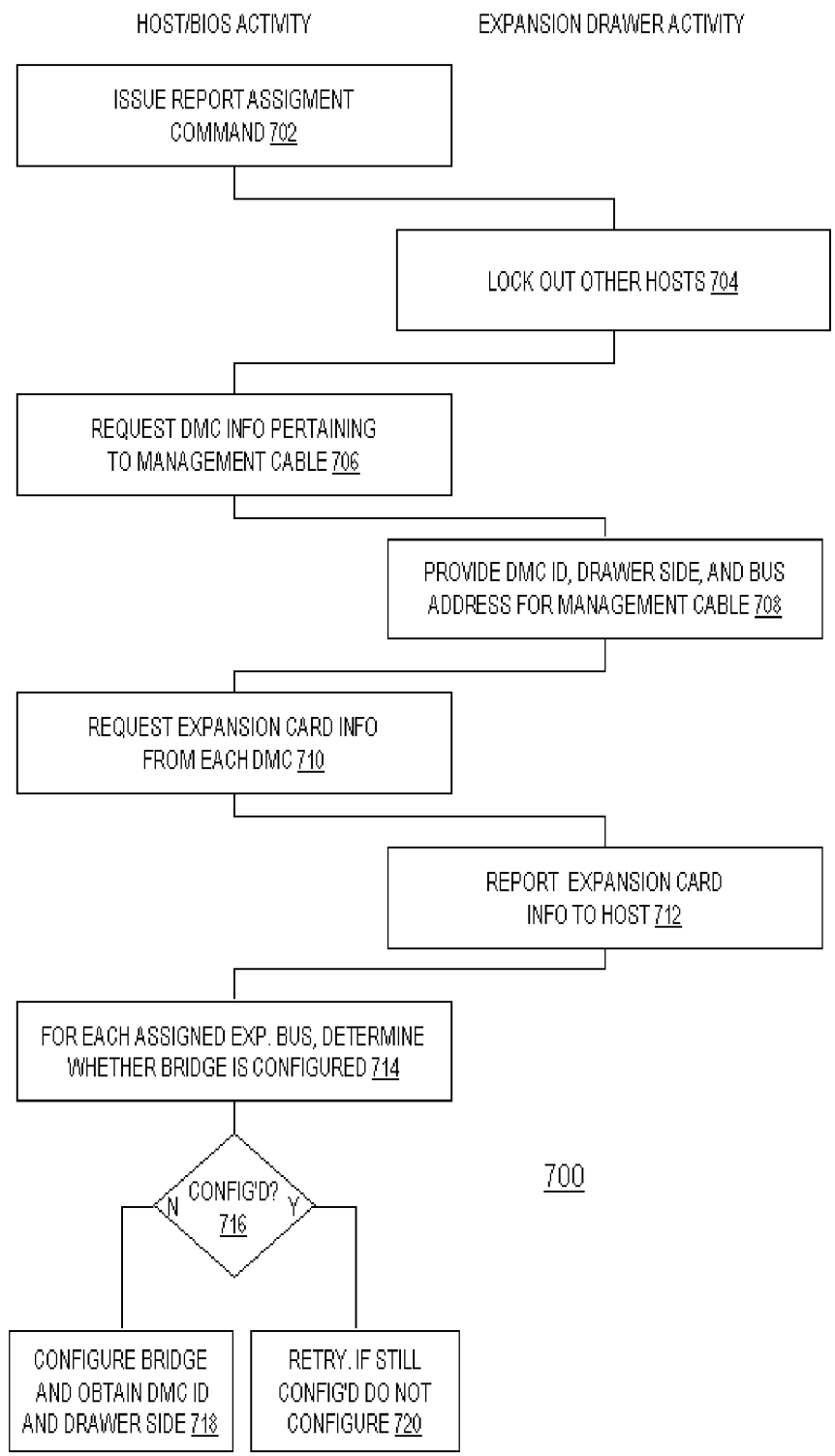
FIG. 7 is a flow diagram of a REPORT ASSIGNMENT sequence according to an embodiment of the present invention.

Referring now to FIG. 7 a flow diagram for a method 700 of reporting assignment of remote I/O resources according to one embodiment is presented. Method 700 is presented in the form of a flow chart having two sides where activities performed by one agent are shown on left side of the drawing while activities performed by another agent are shown on the right side. In the depicted embodiment, the primary elements of assembly 100 responsible for implementing the assignment of remote I/O resources are the host BIOS 121 (FIG. 9) and the DMC 220 (FIG. 2) on the expansion drawers. The host BIOS communicates with the expansion drawer DMC using the host service processor as an intermediary.

As depicted in FIG. 7, method 700 is initiated when a host BIOS issues a REPORT ASSIGNMENT command (block 702). The REPORT ASSIGNMENT command I/O is a mechanism by which a host requests and retrieves I/O resource assignment information (i.e., assignment state information 250) from the expansion drawer, where the assignment information is stored and maintained. The REPORT ASSIGNMENT command is issued by the host BIOS 121 and routed to DMC 220 of an expansion drawer 101 via the service processor 125 and the DML 150.

Upon receiving a REPORT ASSIGNMENT command from a host via its DML 150, DMC 220 of expansion drawer 101 locks out (block 704) all other hosts 102 from communication with the expansion drawer. The lock out of all but the currently "active" host prevents assignment contention between hosts. The other hosts remain locked out from an expansion drawer until the active host transmits an END ASSIGNMENT command to terminate its session with the expansion drawer.

The REPORT ASSIGNMENT command is a mechanism by which the host 102 requests (block 706) DMC information. In response to the request for DMC information, the depicted implementation of DMC 220 provides (block 708) the host with DMC information including a DMC ID, the drawer side (A-side or B-side) and buss address of the DML port 209 to which the DML 150 is attached.

The REPORT ASSIGNMENT command is a mechanism that further serves as a host request (block 710) for expansion card information from the expansion drawer. Specifically, the REPORT ASSIGNMENT command causes each DMC reported in block 708 to report (block 712) its corresponding expansion card information. The expansion card information includes the number of expansion cards assigned to the host for each DMC identified in block 708.

When all expansion cards assigned to a host are identified, the host BIOS can begin to configure its assigned expansion cards for operation. In this manner, a host 102 is enabled to determine automatically the number of I/O Expansion Cards to configure on each expansion buss and, conversely, to determine which I/O expansions cards not to configure (e.g., expansion cards assigned to other hosts). In the depicted embodiment of method 700, BIOS 121 cycles through all of the bridges 210 on expansion cards 211 assigned to the host and determines (block 714) whether the bridge is already configured. If (block 716) a bridge is not configured, BIOS then configures (block 718) the bridge for operation. If a bridge is configured, BIOS will retry its configuration check (block 720) before concluding that it should not configure this bridge, because the bridge is already configured by another host. The BIOS 121 performs the steps in blocks 710 through 720 for each of its expansion busses 140.

In the manner described above, the REPORT ASSIGNMENT sequence 700 enables the host BIOS to obtain the assignment state of the expansion cards in the expansion drawers 101 of the host/expansion assembly 100. Because the assignment state is maintained on the expansion drawers 101, the host can obtain the information during the boot sequence and need not store this information locally or across boot cycles. This arrangement is beneficial when a new host is brought into the assembly, whether as an addition to the assembly or as a replacement for an existing host, because the new host does not need to be customized to any particular assignment state. Instead, the new host determines which I/O resources it can configure from information supplied by the expansion drawer.

Similarly, because the host 102 retrieves expansion card information from the expansion drawer 101, host 102 is enabled to detect a change in the number of expansion cards and manage the configuration of the new number of expansion cards whether the expansion cards have been added to or removed from the prior configuration. More specifically, if an expansion card 211 is added to or removed from expansion drawer 101, the assignment state 250 is updated to indicate the assignment of a new expansion card or to release the assignment of a removed expansion card. (Updating the assignment state 250 may be achieved using a management agent or through a BIOS-invoked setup menu from a host 102 as described below with respect to FIG. 8).

Figure 8:
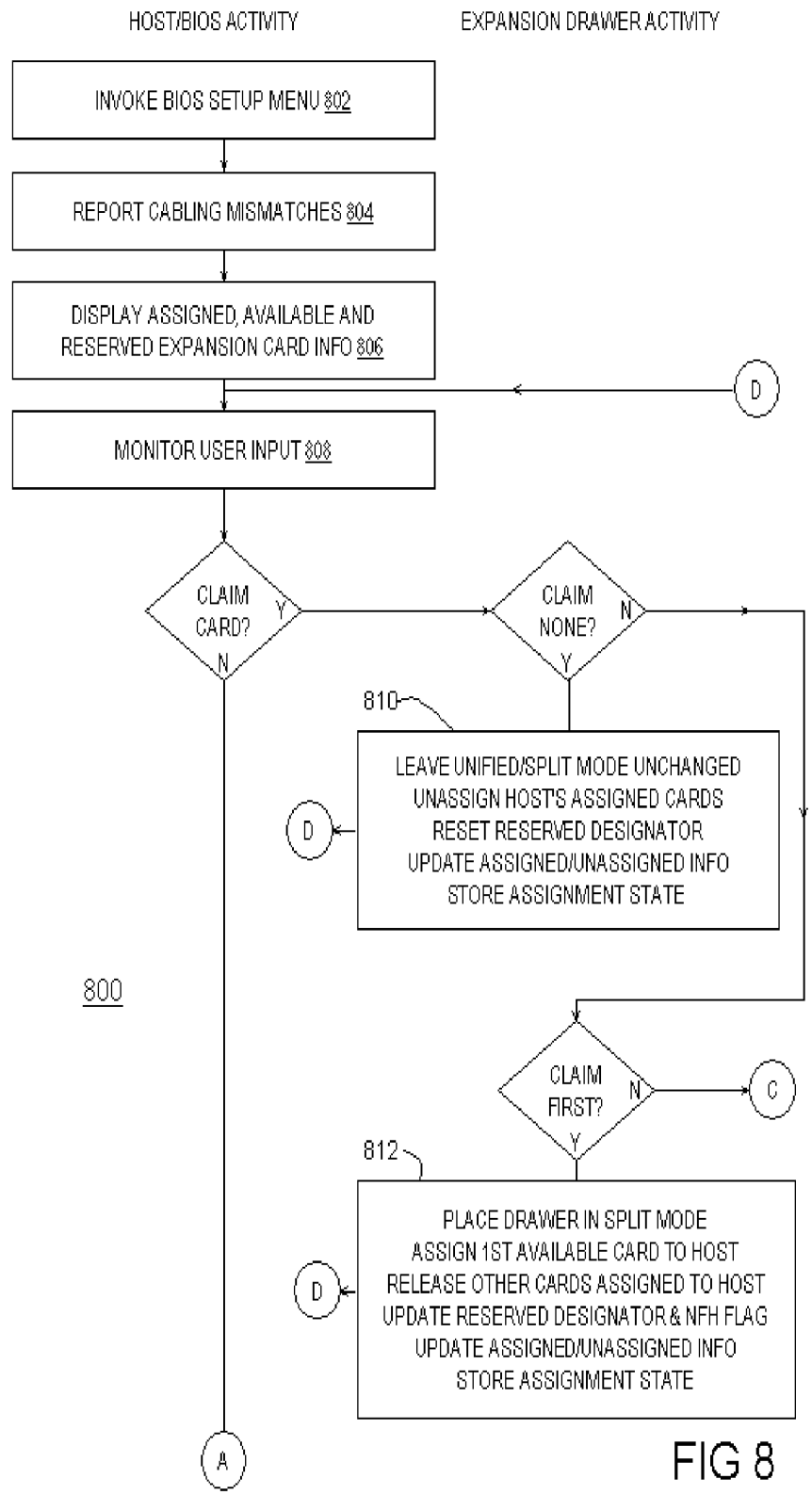
FIG. 8 is a flow diagram of a CHANGE ASSIGNMENT sequence according to an embodiment of the present invention.
Figure 8:
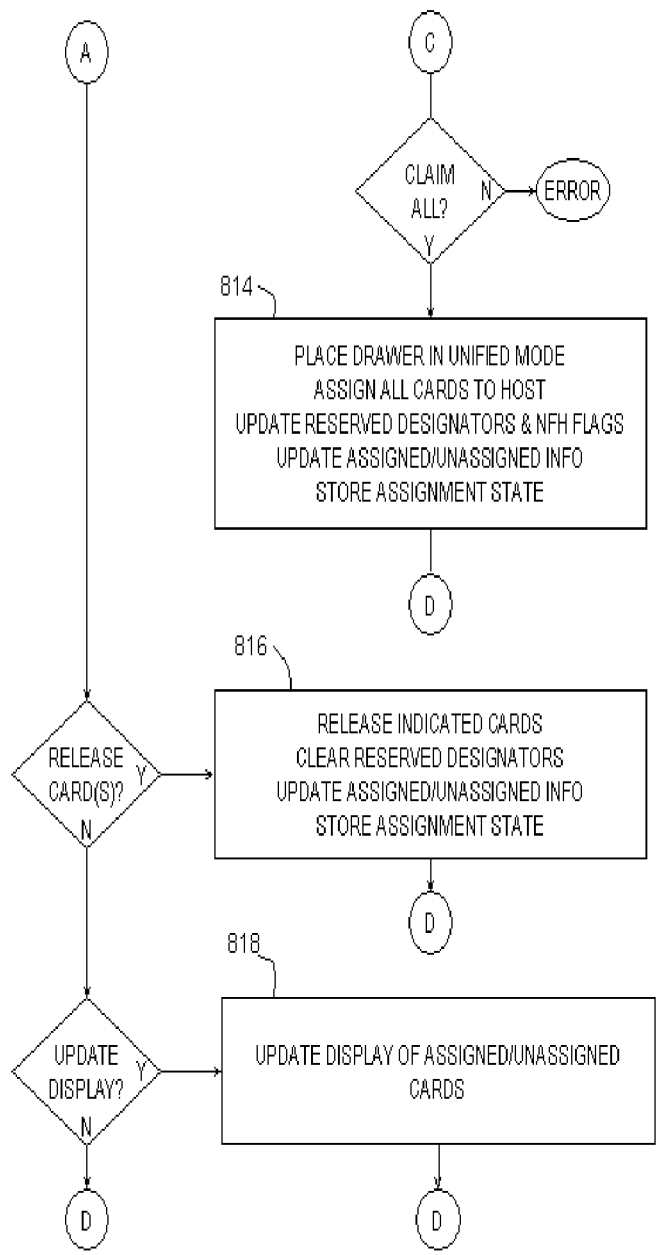

Referring now to FIG. 8, a flow diagram of a CHANGE ASSIGNMENT sequence 800 according to one embodiment of the present invention is presented. The CHANGE ASSIGNMENT sequence, as suggested by its name, enables hosts to alter their I/O resource assignment and to store the altered assignment state on the expansion drawer.

In the depicted embodiment, CHANGE ASSIGNMENT sequence 800 is initiated by a user or administrator invoking (block 802) a BIOS setup menu. Invoking a BIOS setup menu may occur during the boot sequence, but may also be invoked from an Extensible Firmware Interface (EFI) in some embodiments. The BIOS setup menu according to present invention reports (block 804) any cabling mismatches and displays (block 806) information regarding assigned, available, and reserved remote I/O resources within the host/expansion assembly. It should be noted that management agent 104 is capable of accomplishing the same functions as the BIOS setup menu.

In the preferred embodiment, the BIOS setup menu displays an ID associated with the DMC 220 and the expansion drawer side (e.g., side A or side B) to which the DML 150 is connected. The setup menu preferably further displays a DMC ID and expansion drawer side to which each expansion buss 140 is attached. From this information, the BIOS setup menu may report n error indicator if it detects a cabling mismatch, such as when a DML 150 is connected to A-side and the expansion buss 140-1 is connected to the B-side of an expansion drawer.

The BIOS setup menu according to the preferred embodiment also displays expansion card information. The expansion card information indicated in the BIOS menu might include the number of expansion cards assigned to the host and the number of currently unassigned expansion cards. The BIOS menu may further indicate, for each of the assigned expansion cards, whether the expansion card is also reserved by a host. A host may choose to reserve an assigned expansion card so that, in the event the host becomes non-functional, no other host will be able to acquire the expansion card as one of its available resources. This reserved designation might be employed beneficially for I/O resources (e.g., disk space) that contain confidential or classified information.

The BIOS setup menu preferably further displays user-selectable items enabling the user to perform some or all of the following functions: (1) claim unassigned expansion cards; (2) release assigned expansion cards; and (3) update the display of assigned/unassigned expansion cards after each change. The BIOS setup menu may enable the user to assign a reserved designator to each expansion card claimed. The reserved designator, once applied to an expansion card, will prevent any other host from claiming the reserved expansion card in the future, even if the host to which the expansion card is assigned becomes non-functional.

The preferred embodiment of the BIOS setup menu includes a release assignment command that releases (block 816) the expansion cards assigned to the releasing host, resets the reserved designator for each released expansion card, and stores the assignment state 250 back to memory 225. In addition, the BIOS setup menu may include an update item that retrieves the current assignment status information from the DMC and updates (block 818) the information displayed in the setup menu.

In the preferred embodiment, the remote I/O resource information is not retained by the BIOS across boot cycles. Instead, BIOS obtains the information from the expansion drawer(s) at the time of each boot. In this way, a host 102 need not have prior information regarding the assignment of resources in any expansion drawers connected to the host. If, for example, a new host 102 is used to replace a failed host, the new host will acquire the I/O resource assignment information from the expansion drawer when the new host is booted. Hence, a replacement host will retain access to the original host's reserved expansion card(s). This procedure avoids time consuming modification of the replacement host's BIOS setup or host's configuration to the current assignment state of the replaced expansion drawer. In the preferred embodiment, a replacement host's configuration is automatically updated without user or management agent intervention. Thus, the person making the repair action need not know the original host configuration or assignment state of expansion cards.

In the depicted embodiment of the CHANGE ASSIGNMENT command, the user acting through the BIOS setup screen or through the management agent may selects from three options, namely, CLAIM FIRST available expansion card, CLAIM ALL available expansion cards, and CLAIM NONE. The host BIOS monitors (block 808) for input from the user and indicates the CHANGE ASSIGNMENT selection to the expansion drawer DMC which will process the selection and record the resultant assignment information.

If a CLAIM NONE request is received by the expansion drawer DMC from the host, the DMC will take action as indicated by reference numeral 810. Specifically, the DMC will respond to a CLAIM NONE request by leaving the unified/split mode unchanged. In addition, the DMC will "unassign" or clear the assignment of any expansion cards currently assigned to the requesting host. All reserve indicators for these expansion cards will be reset by the DMC, and will also update the assigned/unassigned information for the affected expansion cards. The DMC will then store all of this information (collectively referred to as assignment state information 250) back to memory 225 (FIG. 2) of expansion drawer 211.

If a CLAIM FIRST request is received, the DMC (block 812) will place the expansion drawer in split mode, and assign (and reserve, if requested) the first available expansion card to the requesting host. The DMC will then release any other expansion card assigned to the requesting host. Finally, the expansion drawer DMC will reset the reserved indicator, update the assigned and unassigned information, and store the assignment state back to memory 225. If the I/O Expansion Drawer was originally in unified mode, and there is a second I/O Expansion Card in the drawer, then access to the second I/O Expansion Card by the host will not be possible unless the host utilizes a second I/O Expansion Buss, or restores the I/O drawer to unified mode. Some embodiments of the host/expansion assembly may employ a non-functional host indicator that is activated when a host becomes non-functional.

The non-functional host indicator may be beneficial in determining whether an expansion card may be re-assigned to another host. Recalling that a host BIOS determines at boot whether an expansion card bridge has been configured, the non-functional host indicator would be beneficial in enabling a host to detect a situation in which an expansion card that was assigned to (but not reserved by) another host, which has become nonfunctional, should be re-assigned to a requesting host. This situation would enable a functional host, for example, to access critical data when a host to which the expansion card was previously assigned goes down. In embodiments that use a non-functional host indicator, the CLAIM FIRST request will reset the nonfunctional host indicator for the expansion drawer that was assigned as a result of the request.

If a CLAIM ALL request is received, the DMC (block 814) will place the expansion drawer in unified mode, providing the reserved designator is not active, so that the assignment commands received from the host are applied to all of the expansion cards in the drawer. The DMC will also assign all available expansion cards in the drawer to the requesting host, update the reserved designator for each assigned expansion card, and store the assignment state 250 back to memory 225. If an expansion card already has a reserved designator assigned to it from another host, the reserved designator supersedes the requesting host's CLAIM ALL request and the DMC will not assign the expansion card to the requesting host.

Figure 9:
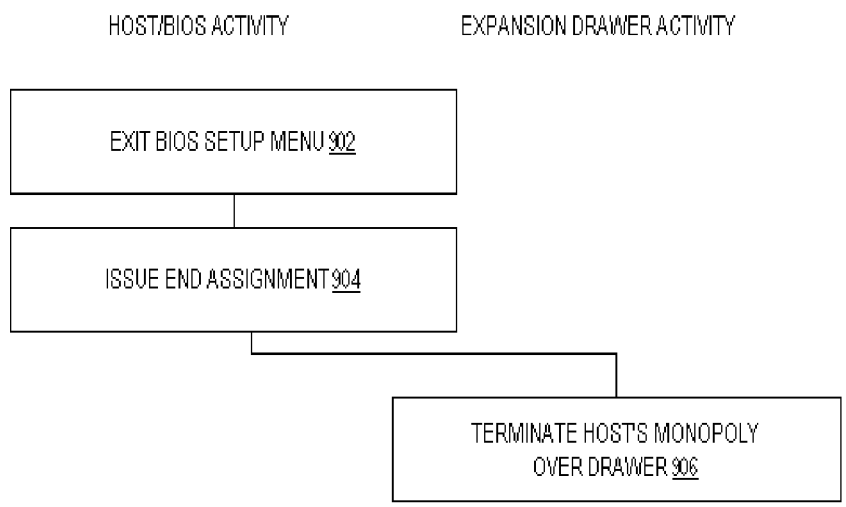
FIG. 9 is a flow diagram of an END ASSIGNMENT sequence according to an embodiment of the present invention.

Referring to FIG. 9, a flow diagram of an END ASSIGNMENT command (900) issued from a controlling host to the expansion drawer is depicted. In the depicted embodiment, the END ASSIGNMENT command is initiated when a controlling host exits (block 902) the BIOS setup menu or management agent. Exiting the BIOS set up menu causes the host to issue (block 904) the END ASSIGNMENT command to the expansion drawer DMC. In response to receiving an END ASSIGNMENT command, the expansion drawer DMC terminates (block 906) the host's monopoly over the expansion drawer thereby enabling other hosts to access the expansion drawer. The END ASSIGNMENT command, in itself, does not modify the expansion card assignments or the expansion drawer mode (i.e., split/unified). Until an END ASSIGNMENT command is received by the DMC, the DMC will not honor any other assignment command from another host.

In the preferred embodiment, the DMC will monitor for the possibility that a host that had previously issued a REPORT ASSIGNMENT command has failed to issue an END ASSIGNMENT command due to a lack of activity for a specified duration. If, for example, a host that issues a REPORT ASSIGNMENT command subsequently becomes non-functional before issuing an END ASSIGNMENT command, the DMC may then detect the problem using, as an example, a service processor heart-beat over the DML, and terminates the REPORT ASSIGNMENT process so that another host may access the DMC.

Figure 11:
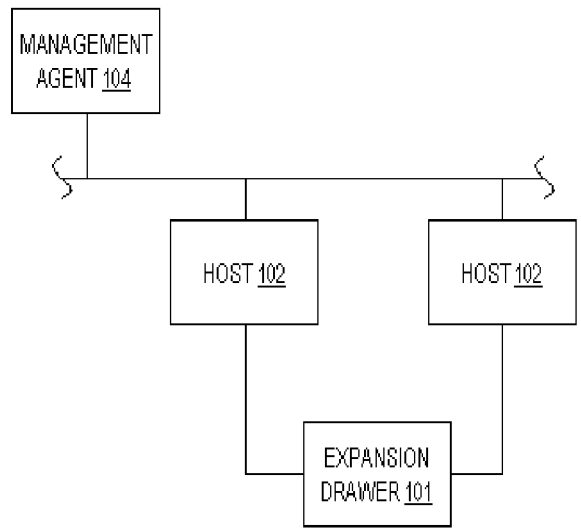
FIG. 11 is a block diagram of selected elements of a host/expansion system according to the present invention in which a management agent is enabled to reconfigure the I/O Expansion Drawer assignments of the hosts.

Referring to FIG. 11, an implementation of the present invention incorporates a network management agent 104. Network management agent may include many features found in commercially distributed management agent applications such as the IBM Director product from IBM Corporation. With respect to the present invention, the management agent 104 provides a centralized facility for invoking the expansion drawer configuration utilities described above for the BIOS setup menu on the individual hosts 102. In this implementation, the management agent is enabled to reconfigure a host's expansion drawer assignments by invoking the REPORT, CHANGE, and END ASSIGNMENT command set through the host's service processor. In this manner, an administrator could reconfigure the I/O Expansion Drawer assignments for multiple hosts from any network location. Following successful reconfiguration, the management agent 104 could then restart each of the hosts.

It will be apparent to those skilled in the art having the benefit of this disclosure that the present invention contemplates a mechanism for implementing a flexibly configured host/expansion drawer assembly. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. An expansion drawer configured to connect, via a first expansion bus cable, to a first host of a first platform type and to connect, via a second expansion bus cable, to a second host of a second platform type, the expansion drawer comprising:
   a first expansion card;
   an expansion drawer controller configured to communicate with the first and second hosts and further configured to set an assignment state for the first expansion card, wherein the assignment state is indicative of whether the first host or the second host may configure the first expansion card; and
   a storage resource of the expansion drawer containing the assignment state indicative of an assignment status of the first expansion card and an availability of the first expansion card;
   wherein the first host is enabled to retrieve the assignment status of the first expansion card from the storage resource and determine whether to configure the first expansion card depending upon information in the assignment status of the first expansion card,
   wherein the first host is configured not to retain the assignment state across boot cycles of the first host, and
   wherein the first host acquires, from the expansion drawer, the assignment state at boot time of the first host.

2. The expansion drawer of claim 1, further comprising a second expansion card, wherein the assignment state is further indicative of an assignment status of the second expansion card wherein the assignment status of the second expansion card is indicative of whether the first host or second host may configure the second expansion card.

3. The expansion drawer of claim 2, wherein the controller is further configured to prevent the first and second hosts from contending to configure the same expansion card.

4. The expansion drawer of claim 2, wherein the expansion drawer may assume a first configuration state in which the first and second expansion cards are configured by a first host, and a second configuration state in which the first and second expansion cards are configured by different hosts.

5. The expansion drawer of claim 1, wherein the controller is configured to enable the first host to configure the second expansion card.

6. The expansion drawer of claim 5, wherein the controller is configured to enable the first host to configure the second expansion card responsive to a failure of the first expansion bus.

7. The expansion drawer of claim 1, wherein the expansion drawer is configured to support a daisy chain connection to a second expansion drawer wherein the first host is enabled to configure expansion cards in each of the expansion drawers.

8. The expansion drawer of claim 1, wherein the controller is enabled to manage dynamic changes in the number of available expansion drawers and expansion cards.

9. The expansion drawer of claim 1, wherein the controller is configured to provide a replacement host substituted for the first host retrieves with the assignment information thereby enabling the replacement host to configure the expansion cards.

* * * * *